United States Patent [19]

Hirschmann

[11] 4,335,455
[45] Jun. 15, 1982

[54] METHOD AND APPARATUS FOR FOUR-WIRE TYPE TRANSMISSION OF DIGITAL MESSAGE SIGNALS

[75] Inventor: Peter Hirschmann, Puchheim, Fed. Rep. of Germany

[73] Assignee: Siemens Aktiengesellschaft, Berlin and Munich, Fed. Rep. of Germany

[21] Appl. No.: 155,389

[22] Filed: Jun. 2, 1980

[30] Foreign Application Priority Data

Jul. 5, 1979 [DE] Fed. Rep. of Germany ....... 2927228

[51] Int. Cl.³ ............................................. H04M 3/00
[52] U.S. Cl. ...................................... 370/29; 370/32; 370/108
[58] Field of Search ..................... 370/29, 26, 24, 108, 370/32

[56] References Cited

U.S. PATENT DOCUMENTS

| 3,542,956 | 11/1970 | Sekimoto | 370/32 |
| 3,671,674 | 6/1972 | Lutz | 370/108 |
| 3,906,159 | 9/1975 | Lutz | 370/108 |
| 3,974,339 | 8/1976 | Lutz et al. | 370/29 |
| 4,049,908 | 9/1977 | Knorpp et al. | 370/29 |
| 4,053,714 | 10/1977 | Long | 370/108 |
| 4,063,041 | 12/1977 | Vollnhals | 370/29 |
| 4,279,033 | 7/1981 | Brunelli et al. | 370/29 |
| 4,287,593 | 9/1981 | Stover | 370/108 |

Primary Examiner—Gerald L. Brigance
Attorney, Agent, or Firm—Spellman, Joel & Pelton

[57] ABSTRACT

A method and apparatus for the four-wire type transmission of digital message signals between a superordinate system, such as a digital exchange, and a subordinate system, such as a digital subscriber station, along a two-wire transmission line. A regenerator is inserted at a given point in the transmission line which switches the message signal blocks repeatedly and alternately transmitted between the superordinate system and the subordinate system onto a four-wire line within the regenerator. The message signal blocks transmitted from the subordinate system to the superordinate system are separately delayed within the regenerator by a delay time period sufficient to avoid overlap with the time periods during which the message signal blocks transmitted by the superordinate system are received at the regenerator.

14 Claims, 2 Drawing Figures

METHOD AND APPARATUS FOR FOUR-WIRE TYPE TRANSMISSION OF DIGITAL MESSAGE SIGNALS

BACKGROUND OF THE INVENTION

The invention relates to a method and apparatus for the four-wire type transmission of digital message signals between a superordinate system, such as a digital exchange, and a subordinate system, such as a digital subscriber station, along a two-wire transmission line. The superordinate and subordinate systems repeatedly and alternately transmit to each other message signal blocks which comprise at least one message signal word, a plurality of bits serving for signalling or control and, in the transmission direction from the superordinate system to the subordinate system, a plurality of bits serving for synchronization. A message signal block is sent out by the subordinate system each time it receives a message signal block from the superordinate system, in some cases after the expiration of a prescribed time delay.

As a result of this four-wire type utilization of the two-wire line and, in particular, the successive transmission in both directions along the line, the range of such a transmission method is limited not only by the cable attenuation of the transmission line but also by the propagation time of the message signal blocks.

If the subordinate systems constitute digital subscriber stations and the superordinate systems digital exchanges, subscriber line connection lengths of up to 10 km are theoretically possible. However, depending upon the transmission frequency and type of encoding, the distance ranges attainable until now are only in the order of 5 to 6 km.

It is, therefore, an object of the present invention to provide a transmission method and apparatus for which the lengths of the subscriber lines can be in the order of magnitude of the theoretical maximum.

SUMMARY OF THE INVENTION

The above-noted object, as well as other objects which will become apparent from the explanation that follows, are achieved, according to the present invention, by passing the message signal blocks through a regenerator, inserted at a prescribed point in the two-wire subscriber line such that the message signal blocks transmitted by the superordinate system require a transmission time period $\tau$ to reach this point and such that the message signal blocks transmitted by the subordinate system arrive at the point no later than the time period $\tau$ following the commencement of transmission of the next message signal block by the superordinate system. Each message signal block which originates at the subordinate system is temporarily delayed within the regenerator until the next subsequent message signal block coming from the superordinate system has passed through the regenerator. This delay is not so long, however, that the delayed message signal block will arrive at the superordinate system after the commencement of transmission of a next subsequent message signal block.

The present invention makes it possible, with much greater line lengths than in the past, to avoid that message signal blocks coincide wholly or partly in time on the two-wire transmission line in the two transmission directions due to their propagation times. With message signal blocks which are 20 bits in length, composed of two message signal words of 8 bits each, two signalling bits and two synchronization bits, operating at a transmission frequency of 0.256 MHz and a propagation time of 6.5, $\mu$sec/km, it is possible to achieve line lengths in the range of 8.5 km. For message signal blocks of 38 bits in length at a transmission frequency of 0.204 MHz and the same propagation time, the attainable range is 12.3 km.

If the attenuation conditions so require, according to further development of the invention, the regenerator may provide for amplitude regeneration of the bits of the message signal blocks in both transmission directions.

According to still another development of the invention, the regenerator may be comprised of the same circuit components which are employed at the interface between the two-wire transmission line and the subordinate system and/or the superordinate system, respectively. Specifically, such components include (1) time switches (multiplexors) which in the regenerator serve to separate and reunite the message signal blocks proceeding in the two transmission directions at the time that they reach, and leave, the regenerator and/or (2) transceiving systems by means of which the aforementioned amplitude regeneration is effected.

For a full understanding of the present invention, reference should now be made to the following detailed description of one preferred embodiment of the invention and to the accompanying drawing.

DESCRIPTION OF THE PREFERRED EMBODIMENTS

Figure 1:
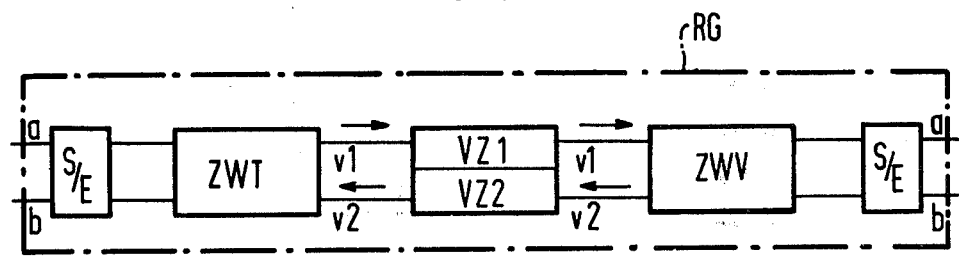
FIG. 1 is a block diagram of a regenerator according to a preferred embodiment of the invention.

As FIG. 1 shows, the regenerator RG provided according to the invention is inserted in a two-wire transmission line having wires a and b, which for example connects a digital subscriber station (not shown), imagined to be on the left side, as a subordinate system with a digital exchange (not shown), imagined to be on the right side, as a superordinate system.

The digital exchange and the digital subscriber station transmit to each other, via this two-wire transmission line, message signal blocks which comprise at least one message signal word, a plurality of bits serving for signalling (control) and, in the direction of transmission from the digital exchange to the digital subscriber station, a plurality of bits serving for synchronization. The transmission is of the four-wire type: i.e., the message signal blocks occur successively in the two transmission directions on the transmission line.

If the attenuation conditions on the two-wire transmission line so require, the regenerator is provided with a transceiving unit both on the subscriber station side as well as on the exchange side, which effects an amplitude regeneration of the bits of the message signal blocks in both transmission directions. These transceiving units are indicated as elements S/E in FIG. 1.

In addition to these transceiving units, the regenerator RG is further provided with two time switches (time dividing networks or multiplexors) ZWT and ZWV, located on the subscriber station side and on the exchange side, respectively. These time switches serve to divide the message signal blocks received in the two transmission directions, which were separated only in time on the two-wire subscriber line, now also in space over separate, four-wire line branches v1 and v2 or, respectively, to inter-leave them again in time when passing them out in the direction toward the subscriber line.

The four-wire line branch v1, over which the message signal blocks coming from the digital subscriber station are conducted, leads via a delay element VZ1, while the four-wire line branch v2, over which the message signal blocks coming from the digital exchange are conducted, leads via a delay element VZ2. The delay time of VZ2 may be negligibly small and is not required for operation of the regenerator according to the present invention.

Figure 2:
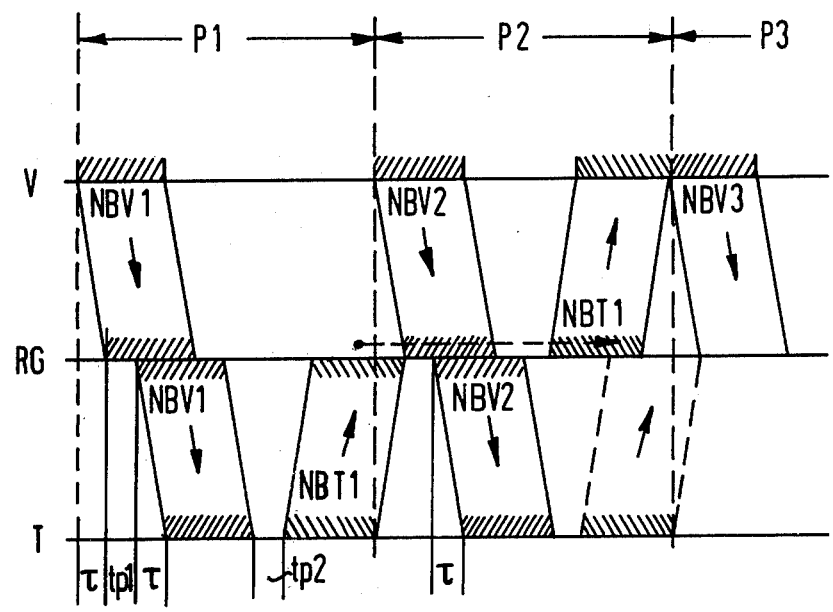
FIG. 2 is a time diagram illustrating the operation of the regenerator of FIG. 1.

FIG. 2 shows the transmit and receive time spans of message signal blocks at both the digital exchange V and the digital subscriber station T as well as the regenerator RG according to the invention. As may be seen from this representation, a message signal block NBV1, which starts from the digital exchange V at the beginning of the transmission period P1, arrives after a propagation time $\tau$ at the regenerator RG. After a short delay tp1 caused by the limited operating speed of the time switch ZWV, this message signal block is forwarded and arrives, on the assumption that the regenerator RG is inserted in the center of the two-wire transmission line, at the digital subscriber station likewise after a propagation time $\tau$.

As FIG. 2 also shows, the digital subscriber station starts to send a message signal block NBT1 after the entire message signal block NBV1 coming from the digital exchange has been received. A short time delay tp2 between reception and transmission may be provided to suppress echo signals.

As indicated in FIG. 2, the message signal block NBT1 reaches the regenerator RG before the arrival of the second message signal block NBV2, sent out in the second transmission period P2 from the digital exchange. The last-named condition is maintained due to the fact that both the total length of the two-wire transmission line and the section lying between the digital subscriber station and regenerator RG do not exceed a certain length. It will be understood, however, that the last-mentioned path section need not necessarily have one half the total line length.

FIG. 2 further shows that a direct onward transmission of the message signal block NBT1 from the regenerator RG to the digital exchange would lead to a time overlap with the message signal block NBV2 coming from the exchange in the next considered transmission period P2. The retransmission of the message signal block NBT1 is therefore effected, according to the invention, after a longer delay time, which must be at least long enough so that no time overlap will result with the receiving time period and with the transmitting time period, at the regenerator RG, for the message signal block NBV2. On the other hand, it must not be so long that a time overlap occurs at the digital exchange upon the reception of the message signal block NBT1 with the sending of the next message signal block NBV3. Considering the propagation time, therefore, since the transmitting time for the message signal block NBV3 coincides with the start of the third transmission period P3, the time period during which the message signal block NBT1 is received at the exchange must not extend into this third transmission period P3.

The ranges of transmission attainable with the aid of the method and apparatus according to the invention cover virtually all line lengths that occur in practice in connection of digital subscriber stations and digital exchanges via two-wire subscriber lines.

There has thus been shown and described a novel method and apparatus for four-wire type transmission of digital message signals which fulfills all the objects and advantageous sought therefore. Many changes, modifications, variations and other uses and applications of the subject invention will, however, become apparent to those skilled in the art after considering this specification and the accompanying drawings which disclose preferred embodiments thereof. All such changes, modifications, variations and other uses and applications which do not depart from the spirit and scope of the invention are deemed to be covered by the invention which is limited only by the claims which follow.

What is claimed is:

1. A method for the two-wire transmission of digital message signals on a two-wire transmission line between a superordinate system, such as a digital exchange, and a subordinate system, such as a digital subscriber station, in the form of message signal blocks which comprise at least one message signal word and signalling bits in both transmission directions, as well as sychronization bits in the transmission direction from the superordinate system to the subordinate system, and which are repeatedly and alternately transmitted between said superordinate system and said subordinate system with a prescribed transmission period (P) initiated by the transmission of a message signal block by said superordinate system, said subordinate system transmitting a subordinate message signal block (NBT) in response to the receipt of each superordinate message signal block (NBV) transmitted by said superordinate system, possibly after expiration of a prescribed delay, said method comprising the steps of:

(a) passing said message signal blocks through a regenerator located in said two-wire transmission line at such a point that each subordinate message signal block (NBT) which is sent within a first transmission period (P1) arrives at said regenerator no later than a time period $\tau$ following the beginning of the next subsequent transmission period (P2), where said time period $\tau$ is the transmission time period between said superordinate system and said regenerator; and (b) delaying the subordinate message signal blocks (NBT) in said regenerator by a delay time period which is chosen to be sufficiently long that the superordinate message signal blocks (NBV) transmitted by the superordinate system pass said point in the transmission line during the delay time period, but not so long that the delayed subordinate message signal blocks are received at said superordinate system during the time periods of transmission of said superordinate message signal blocks.

2. A method recited in claim 1, further comprising the step of regenerating the amplitude, in said regenerator, of the bits of said subordinate and said superordinate message signal blocks to overcome attenuation in said two-wire transmission line.

3. A method recited in either one of claim 1 or 2, further comprising the step of switching said message signal blocks between two-wire time-divided transmission on said two-wire transmission line and four-wire space-divided transmission within said regenerator, said delaying step taking place while said subordinate message signal blocks are in the four-wire space-divided transmission branch of the regenerator.

4. Regenerator apparatus for use in a two-wire transmission line between a superordinate system, such as a digital exchange, and a subordinate system, such as a digital subscriber station, which repeatedly and alternately transmit to each other message signal blocks with a prescribed transmission period (P) initiated by the transmission of a message signal block by said superordinate system; said subordinate system transmitting a subordinate message signal block (NBT) in response to the receipt of each superordinate message signal block (NBV) transmitted by said superordinate system, said regenerator comprising, in combination:
  (a) first time switch means (ZWV), coupled to the two-wire transmission line extending from the superordinate system, for switching between two-wire time-divided transmission on said two-wire transmission line and four-wire space-divided transmission within said regenerator apparatus;
  (b) second time switch means (ZWT), coupled to the two-wire transmission line extending from the subordinate system, for switching between two-wire time-divided transmission on said two-wire transmission line and four-wire space-divided transmission within said regenerator apparatus;
  (c) a four-wire transmission line coupling said first and second time switch means for transmission of subordinate message signal blocks (NBT1, NBT2 . . . ) in one direction along a first branch (v1) and superordinate message signal blocks (NBV1, NBV2 . . . ) in the opposite direction along a second branch (v2);
  (d) first time delay means (VZ1) arranged in said first four-wire line branch (v1) for delaying said subordinate message signal blocks in said first branch by a delay time period which is chosen to be sufficient to avoid transmission of said subordinate message signal blocks on the two-wire line between said regenerator and said superordinate system during the time periods in which said superordinate message signal blocks are received at said regenerator.

5. The regenerator apparatus recited in claim 4, wherein said delay time period is chosen to be sufficient also to avoid transmission of said subordinate message signal blocks on the two-wire line between said regenerator and said superordinate system during the time periods in which said superordinate message signal blocks are retransmitted by said regenerator.

6. The regenerator apparatus recited in claim 4, wherein said delay time is chosen to be not so long that the delayed subordinate message signal blocks are received at said superordinate system during the time periods of transmission of said superordinate message signal blocks.

7. The regenerator apparatus recited in claim 4, wherein said subordinate and said superordinate message signal blocks each comprise at least one message signal word and a plurality of signalling bits.

8. The regenerator apparatus recited in claim 7, wherein said superordinate message signal blocks further comprise a plurality of synchronization bits.

9. The regenerator apparatus recited in claim 4, further comprising second time delay means (VZ2) arranged in said second four-wire line branch (v2) for delaying said superordinate message signal blocks in said second branch.

10. The regenerator apparatus recited in claim 4, further comprising transceiver means, coupled to said two wire lines extending in both directions, for regenerating the amplitude of the bits of both said subordinate and said superordinate message signal blocks.

11. The regenerator apparatus recited in claim 10, wherein the transmitting and receiving means in the superordinate system at its interface to said two-wire line is a transceiver of the same type as at least one of said transceiver means in said regenerator.

12. The regenerator apparatus recited in claim 10, wherein the transmitting and receiving means in the subordinate system at its interface to said two-wire line is a transceiver of the same type as at least one of said transceiver means in said regenerator.

13. The regenerator apparatus recited in claim 4, wherein the two-to-four wire switching circuit in the superordinate system for the separation and recombination of the message signal blocks in the two transmission directions is of the same type as said first and second time switch means (ZWV, ZWT).

14. The regenerator apparatus recited in claim 4, wherein said apparatus is located in said two-wire transmission line at such a point that each subordinate message signal block (NBT) which is sent within a given transmission period (P1) arrives at said regenerator apparatus no later than a time period $\tau$ following the commencement of transmission of the next superordinate message signal block in the following transmission period (P2), where said time period $\tau$ is the transmission time between said superordinate system and said regenerator apparatus.

* * * * *